(12) United States Patent
Kehoe (10) Patent No.: US 11,909,822 B2
(45) Date of Patent: Feb. 20, 2024

(54) STREAMING ALGORITHM FOR DEFICIT ROUND ROBIN ARBITRATION

(71) Applicant: GM Cruise Holdings LLC, San Francisco, CA (US)

(72) Inventor: Gregory Kehoe, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 449 days.

(21) Appl. No.: 17/364,821

(22) Filed: Jun. 30, 2021

(65) Prior Publication Data
US 2023/0007068 A1   Jan. 5, 2023

(51) Int. Cl.
*H04L 67/12* (2022.01)
*H04L 65/80* (2022.01)
*H04L 47/52* (2022.01)
*H04L 65/611* (2022.01)

(52) U.S. Cl.
CPC ............ *H04L 67/12* (2013.01); *H04L 47/527* (2013.01); *H04L 65/611* (2022.05); *H04L 65/80* (2013.01)

(58) Field of Classification Search
CPC ....... H04L 67/12; H04L 65/80; H04L 47/527; H04L 65/611
See application file for complete search history.

(56) References Cited

U.S. PATENT DOCUMENTS

| | | | | |
|---|---|---|---|---|
| 7,079,545 B1* | 7/2006 | Yun | ....................... | H04L 49/608 370/429 |
| 7,796,629 B1* | 9/2010 | MacAdam | .............. | H04L 49/65 370/352 |
| 2004/0156376 A1* | 8/2004 | Nakagawa | .............. | H04L 47/50 370/417 |
| 2007/0104102 A1* | 5/2007 | Opsasnick | .............. | H04L 47/43 370/412 |
| 2014/0204764 A1* | 7/2014 | Kumar | .................. | H04L 45/302 370/241 |
| 2016/0028643 A1* | 1/2016 | Basso | .................... | H04L 47/527 370/235 |

* cited by examiner

*Primary Examiner* — Henry Tsai
*Assistant Examiner* — Christopher A Daley
(74) *Attorney, Agent, or Firm* — Novak Druce Carroll LLP (57) ABSTRACT

Methods and systems are provided for implementing a streaming deficit round robin arbiter to provide fair utilization of a single link. In some aspects, methods and systems are provided and can include specifying a quantum size indicating how much of a link of a stream is available for use, adding the quantum size to a deficit counter indicating available bandwidth, determining whether to provide a first data packet to an autonomous vehicle system based on the deficit counter and without determining a data packet size of the first data packet, and providing the first data packet to the autonomous vehicle system based on the determining of whether to provide the first data packet to the autonomous vehicle system.

20 Claims, 5 Drawing Sheets

STREAMING ALGORITHM FOR DEFICIT ROUND ROBIN ARBITRATION

BACKGROUND

1. Technical Field

The subject technology provides solutions for autonomous vehicles, and in particular, for implementing a streaming deficit round robin arbiter to provide fair utilization of a single link.

2. Introduction

Autonomous vehicles are vehicles having computers and control systems that perform driving and navigation tasks that are conventionally performed by a human driver. As autonomous vehicle technologies continue to advance, ride-sharing services will increasingly utilize autonomous vehicles to improve service efficiency and safety. However, autonomous vehicles will be required to perform many of the functions that are conventionally performed by human drivers, such as avoiding dangerous or difficult routes, and performing other navigation and routing tasks necessary to provide a safe and efficient transportation. Such tasks may require the collection and processing of large quantities of data disposed on the autonomous vehicle.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Figure 1:
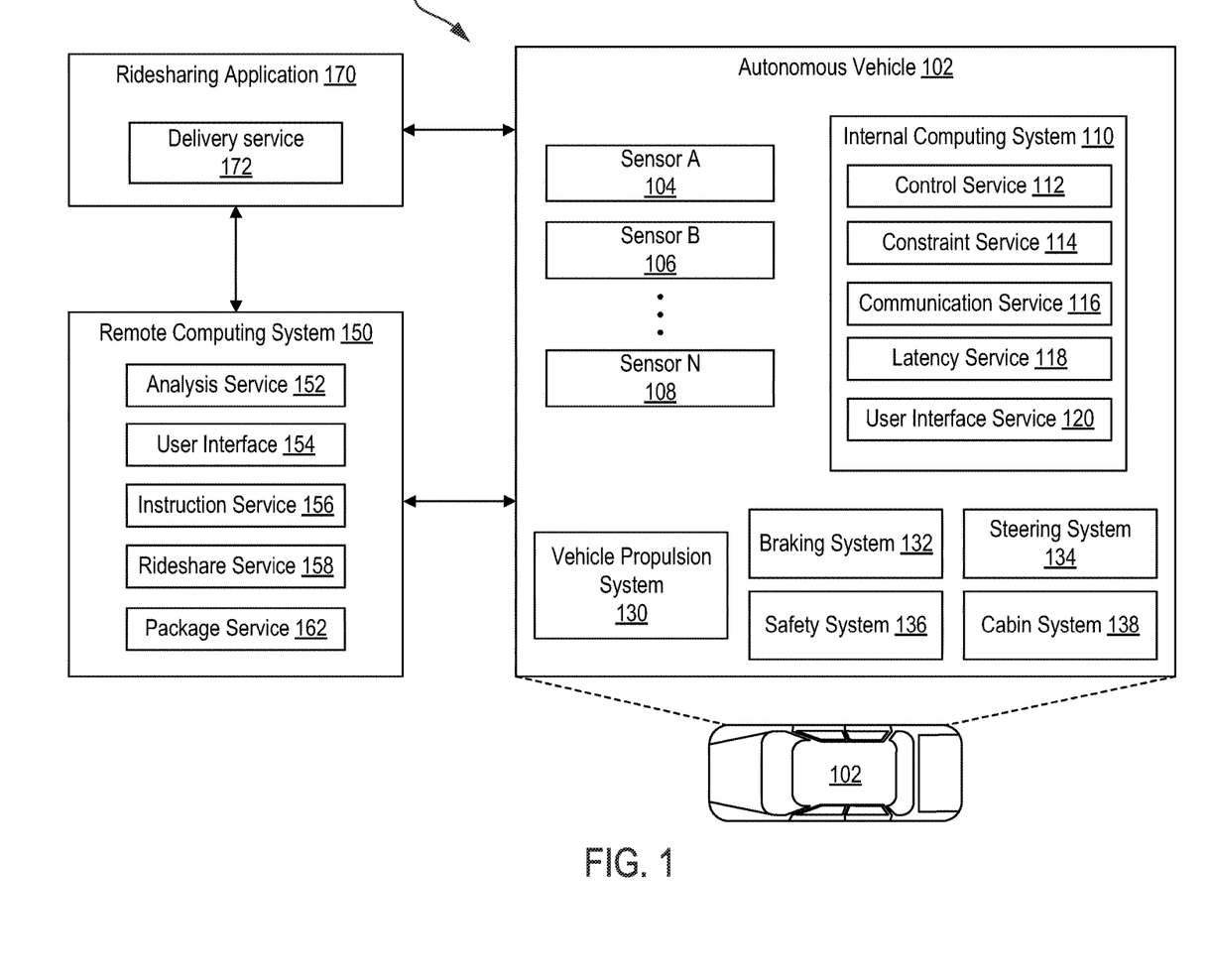
FIG. 1 illustrates an example system environment that can be used to facilitate autonomous vehicle navigation and routing operations, according to some aspects of the disclosed technology.

FIG. 1 illustrates an example system environment 100 that can be used to facilitate AV dispatch and operations, according to some aspects of the disclosed technology. Autonomous vehicle 102 can navigate about roadways without a human driver based upon sensor signals output by sensor systems 104-106 of autonomous vehicle 102. Autonomous vehicle 102 includes a plurality of sensor systems 104-106 (a first sensor system 104 through an Nth sensor system 106). Sensor systems 104-106 are of different types and are arranged about the autonomous vehicle 102. For example, first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation.

Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 180 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 180 as well communicates with other services of internal computing system 110 to effectuate operation of autonomous vehicle 102. In some embodiments, control service 112 may carry out operations in concert one or more other systems of autonomous vehicle 102.

Internal computing system 110 can also include constraint service 114 to facilitate safe propulsion of autonomous vehicle 102. Constraint service 116 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides connectivity using one or more cellular transmission standards, such as long-term evolution (LTE), 3G, 5G, or the like.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

Remote computing system 150 can also include rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As described herein, one aspect of the present technology is to provide an autonomous vehicle system that can implement a streaming deficit round robin arbiter to provide fair utilization of a single link. The present disclosure contemplates that in some instances, utilizing a streaming deficit round robin arbiter without having to determine a packet size prior to providing access for a transfer.

Currently, autonomous vehicle systems receive a large amount of data from various vehicle electronic control units (ECUs) and sensors distributed throughout the autonomous vehicle. All of the data received from the ECUs and sensors provide necessary information relating to certain aspects of the autonomous vehicle such as speed, cabin conditions, and pedestrian detection. In some instances, there may be scenarios where certain types of information (e.g., data) is more important than others. For example, data relating to pedestrian detection may be more valuable than the current temperature of the interior cabin of the autonomous vehicle. In such instances, it would be more beneficial to prioritize the pedestrian detection data ahead of the autonomous vehicle cabin data. However, current streaming algorithms are unable to prioritize sensor data because all data (e.g., ECU/sensor data) are treated equally, which means that the pedestrian detection data will have to wait its turn in a queue (e.g., that include packet data size requirements) before a corresponding pedestrian detection system can provide the data to an internal computing system of the autonomous vehicle system for processing. Moreover, data from all of the various ECUs and sensors bottleneck prior to be received by the internal computing system of the autonomous vehicle system, which further restricts how and when data is received from the ECUs and sensors.

Aspects of the disclosed technology address the foregoing limitations of conventional use of a streaming algorithm by implementing a streaming deficit round robin arbiter that can provide fair utilization of a single link across multiple competing network traffic flows without determining a packet size prior to granting access.

As discussed in further detail below, methods and systems are provided for implementing a streaming deficit round robin arbiter to provide fair utilization of a single link. In some aspects, methods and systems are provided and can include specifying a quantum size indicating how much of a link of a stream is available for use, adding the quantum size to a deficit counter indicating available bandwidth, determining whether to provide a first data packet to an autonomous vehicle system based on the deficit counter and without determining a data packet size of the first data packet, and providing the first data packet to the autonomous vehicle system based on the determining of whether to provide the first data packet to the autonomous vehicle system.

Figure 2:
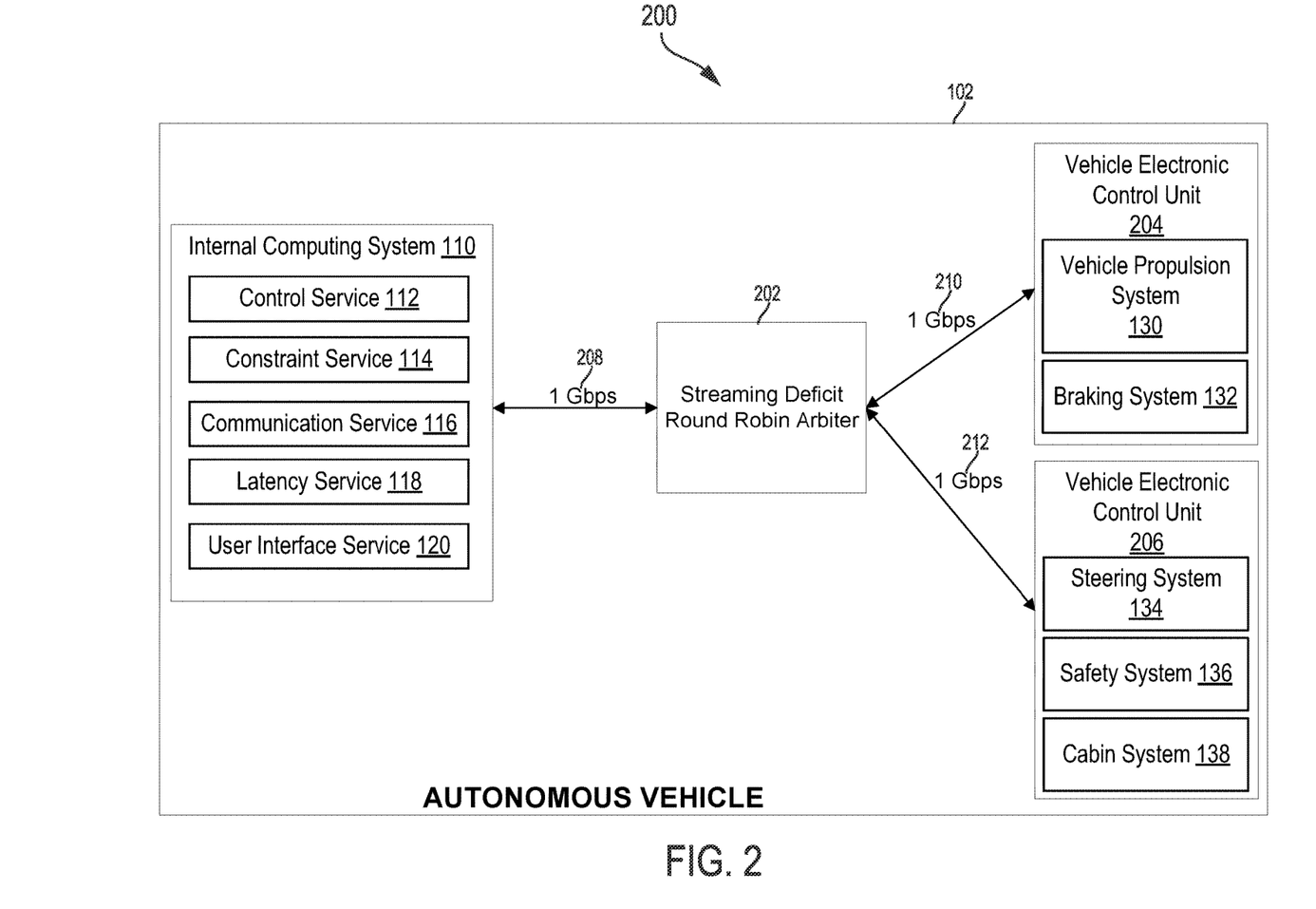
FIG. 2 illustrates an example system environment that can be used to facilitate autonomous vehicle navigation and routing operations with a streaming deficit round robin arbiter, according to some aspects of the disclosed technology.

FIG. 2 illustrates an example system environment that can be used to facilitate autonomous vehicle navigation and routing operations with a streaming deficit round robin arbiter, according to some aspects of the disclosed technology 200. In some implementations, the autonomous vehicle system 200 can include an autonomous vehicle 102, an internal computing system 110, a streaming deficit round robin arbiter 202 (e.g., a server), and vehicle electronic control units (ECUs) 204, 206. In some examples, the internal computing system 110 can be communicatively coupled to the streaming deficit round robin arbiter 202 with a 1 Gbps line 208 (e.g., an Ethernet connection), and the streaming deficit round robin arbiter 202 can be communicatively coupled to the vehicle ECUs 204, 206 with a 1 Gbps line 210, 212, respectively. While FIG. 2 illustrates single 1 Gbps Ethernet connectivity between the streaming deficit round robin arbiter 202 and the vehicle ECUs 204, 206, smaller or larger Ethernet connectivity capabilities may be utilized. For example, Ethernet connections 210, 212 may be 10 Gbps Ethernet lines, or each of the connection lines 210, 212 may include more than one Ethernet lines (e.g., connection lines 210, 212 may each include two Ethernet connection lines).

In some implementations, the internal computing system 110 can include a control service 112, a constraint service 114, a communication service 116, a latency service 118, a user interface service 120, or any other service suitable for the intended purpose and understood by a person of ordinary skill in the art.

In other implementations, the vehicle ECU 204 can include a vehicle propulsion system 130 and a braking system 132, and the vehicle ECU 206 can include a steering system 134, a safety system 136, and a cabin system 138. The vehicle ECUs 204, 206 can further include other systems that are suitable for the intended purpose and understood by a person of ordinary skill in the art. Furthermore, the above-mentioned systems 130, 132, 134, 136, 138 can include respective sensors that can provide sensor data, of their respective systems 130, 132, 134, 136, 138, to the internal computing system 110, and in some examples, via the streaming deficit round robin arbiter 202 along line connections 208, 210, 212 (e.g., Ethernet connections).

In some implementations, the autonomous vehicle system 200 can circumvent requirements such as requiring that the packet size be known before a packet queue is serviced (e.g., completed). The streaming deficit round robin arbiter 202 of the autonomous vehicle system 200 can provide fair utilization while providing cut-through switching to reduce latency for time-sensitive, safety-critical sensor traffic on the autonomous vehicle system 200.

The streaming deficit round robin arbiter 202 of the autonomous vehicle system 200 can utilize an algorithm that can ignore packet sizes prior to transferring the data packet to an output interface of the autonomous vehicle system 200. Instead of buffering a data packet and comparing its size to a queue's deficit counter (DC) before data transmission (which takes time and resources to facilitate), a queue can be serviced (e.g., allowed to provide at least one packet) if its DC>=0. Data packets can be serviced from the queue until either its DC<0 or the queue is empty.

For example, the streaming deficit round robin arbiter 202 can provide an implementation of a Deficit Round Robin (DRR) algorithm for AXI4-Stream interfaces. DRR algorithms can provide fairness for traffic flows (e.g., queues) by including variable packet sizes. The streaming deficit round robin arbiter 202 can also perform cut-through switching of packets and arbitrate TLAST (e.g., designating the last pixel of each line, i.e., end of line) with no interleaving of transfers from different packets.

In some implementations, the data packet size is not known before transferring the data packet to an output interface (e.g., the internal computing system 110). Instead of buffering a data packet and comparing its size to a queue's deficit counter (DC)(e.g., deficit counter 306 as shown in FIGS. 3A-F) before transmission, a queue (e.g., data packet queue 304 as shown in FIGS. 3A-F) can be serviced (e.g., allowed to send at least one data packet) if the DC>=0. Data packets can also be serviced from the data packet queue 304 until either its DC<0 or the queue is empty.

In some examples, the streaming deficit round robin arbiter 202 of the autonomous vehicle system 200 can maintain a data packet queue 304 that may "pay back" its unfair share of a link for packet sizes that exceeds the available quantum (e.g., the quantum value of the deficit counter 306). The streaming deficit round robin arbiter 202 of the autonomous vehicle system 200 can facilitate traffic flows that can "borrow" bandwidth that may be "returned" to other flows, instead of "saving up" enough quantum to "acquire" bandwidth for larger data packets.

In other implementations, the streaming deficit round robin arbiter 202 of the autonomous vehicle system 200 can maintain that a queue be "pay back" its unfair share of a single link (e.g., line connection 208) for packet sizes that exceed a quantum limit. The streaming deficit round robin arbiter 202 of the autonomous vehicle system 200 can provide a "pay back" mechanism where traffic flows (e.g., via line connections 210, 212 from vehicle ECUs 204, 206) "borrow" bandwidth that can be "returned" to other flows (e.g., via line connections 210, 212 from vehicle ECUs 204, 206), instead of "saving up" enough quantum to "acquire" bandwidth for larger data packets.

Figure 3A:
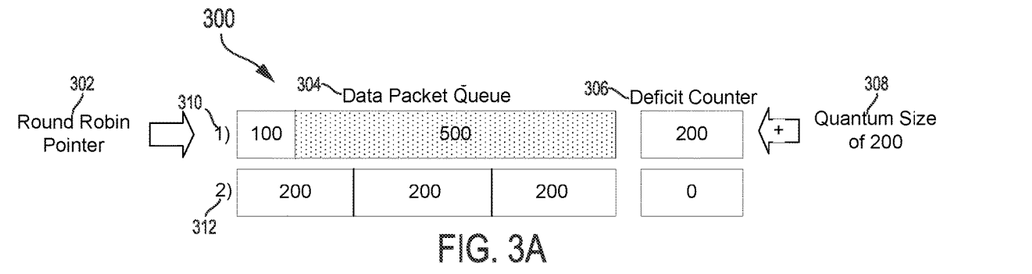
FIGS. 3A-F illustrate an example process of utilizing a streaming deficit round robin arbiter, according to some aspects of the disclosed technology.

In some implementations, the streaming deficit round robin arbiter 202 of the autonomous vehicle system 200 can include a deficit counter that indicates available data packet size for transmission for the next data packet in a queue (e.g., data packet queue 304 in FIG. 3A). The streaming deficit round robin arbiter 202 can permit the deficit counter to go negative, which can allow for the algorithm to send the data packet regardless of size and then to "pay back" the deficit, as further illustrated in FIGS. 3A-3F. In some examples, the streaming deficit round robin arbiter 202 can prevent a very large data packet in the queue from bottlenecking smaller data packets by preventing the large data packet from transmission.

As described herein, the streaming deficit round robin arbiter 202 of the autonomous vehicle system 200 can operate without knowledge of the data packet size prior to transferring the data packet to an output interface. Instead of buffering a data packet and comparing its size to queue deficit counter prior to transmission, the queue can be serviced if its deficit counter is greater than or equal to zero, as shown in FIGS. 3A-3F. Data packets can then be serviced from the queue (e.g., data packet queue 304 in FIG. 3A) until its deficit counter is less than 0 or the queue is empty.

In some examples, where each of the vehicle ECUs 204, 206 communicate with the streaming deficit round robin arbiter 202 via line connections 210, 212 (e.g., 1 Gbps lines), potentially, there are two gigabits of inbound data into the streaming deficit round robin arbiter 202. However, there may only be one 1 Gbps link connecting the streaming deficit round robin arbiter 202 with the internal computing system 110. In such instances, the streaming deficit round robin arbiter 202 may be a bottleneck for data transmission. The autonomous vehicle system 200 can also be data packet based and utilize statistical multiplexing for data transmission. For example, the streaming deficit round robin arbiter 202 can utilize a round robin ordered arbitration, where the data from one of the vehicle ECUs 204 is transmitted over the line connection 208 with the internal computing system 110. Thereafter, the data from vehicle ECU 206 can be transmitted over the line connection 208 with the internal computing system 110.

In some examples, there may be instances where vehicle ECU 204 has large data packets to provide to the internal computing system 110, while vehicle ECU 206 only has small data packets to provide to the internal computing system 110. If each of the vehicle ECUs 204, 206 are allocated equal times for transmission, vehicle ECU 204 will essentially be allocated a larger portion of bandwidth (in totality) as its data packets are larger than the data packets of the vehicle ECU 206. In some implementations, the streaming deficit round robin arbiter 202 of the autonomous vehicle system 200 utilizes a deficit counter that indicates available data packet size for transmission for the next data packet in a queue to provide fair utilization of a single link connection across multiple competing network traffic flows without having to determine a packet size of the data packets prior to granting access.

In other implementations, the streaming deficit round robin arbiter 202 of the autonomous vehicle system 200 can further utilize a quantum value (e.g., quantum size 308 of FIGS. 3A-3F) to add a data packet size to the deficit counter (e.g., the deficit counter 306 of FIGS. 3A-3F).

FIGS. 3A-3F illustrate an example process of utilizing a streaming deficit round robin arbiter 300, according to some aspects of the disclosed technology. In some implementations, the streaming deficit round robin arbiter 300 can include a round robin pointer 302, a data packet queue 304, a deficit counter 306, and a quantum size 308. In some examples, the data packet queue 304 can also include multiple data packets for transmission such as data packet position 310 and data packet position 312. Data packet position 310 can include data packets that are queued for transmission such as a 100 byte data packet and a 500 byte data packet. Data packet position 312 can include data packets that are queued for transmission such as three 500 byte data packets. Various sizes of the data packets are also contemplated by the present disclosure.

Referring to FIGS. 3A-3F, the streaming deficit round robin arbiter 300 can also utilize the deficit counter 306 to determine and provide a current allocated data packet size availability. At each step of FIGS. 3A-3F, a quantum size of 200 bytes is allocated to the currently selected data packet position 310, 312 via the round robin pointer 302. For example, at FIG. 3A, data packet position 310 is allocated 200 bytes of data by quantum size 308, which increases the deficit counter 306 to a value of 200 bytes. The round robin pointer 302 of FIG. 3A can indicate that data packet position 310 is currently selected in the data packet queue 304 to transmit its next available data packet, e.g., 500 bytes of data. As the data packet position 312 is not yet selected by the round robin pointer 302, the data packet position 312 is not yet allocated a quantum size of 200 bytes for its deficit counter 306.

Figure 3B:
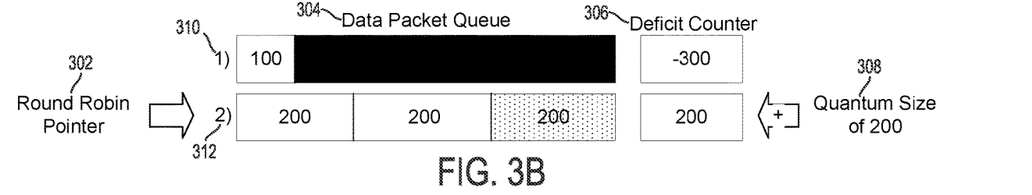

In FIG. 3B, after the 500 bytes of data of data packet position 310 has been transmitted, the deficit counter 306 of the data packet position 310 is reduced to a negative value of −300. The round robin pointer 302 can then proceed to data packet position 312 and allocate a quantum size of 200 bytes 308 to the deficit counter of the data packet position 312. FIG. 3B further illustrates that the data packet position 312 has queued a 200 byte data packet for transmission.

Figure 3C:
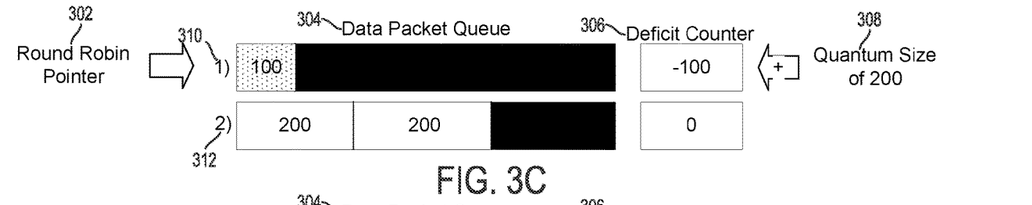

In FIG. 3C, after the 200 bytes of data of data packet position 312 has been transmitted, the deficit counter 306 of the data packet position 312 is reduced to a value of 0. The round robin pointer 302 can then proceed to data packet position 310 and allocate a quantum size of 200 bytes 308 to the deficit counter 306 of the data packet position 310 for a new value of −100 bytes. FIG. 3C further illustrates that the data packet position 310 has queued a 100 byte data packet for transmission. However, as the current value of the deficit counter 306 of the data packet position 310 is −100, the data packet position 310 does not have enough bytes in its deficit counter 306 to transmit the 100 bytes of data. As such, the round robin pointer 302 proceeds to the next data packet position, e.g., data packet position 312.

Figure 3D:
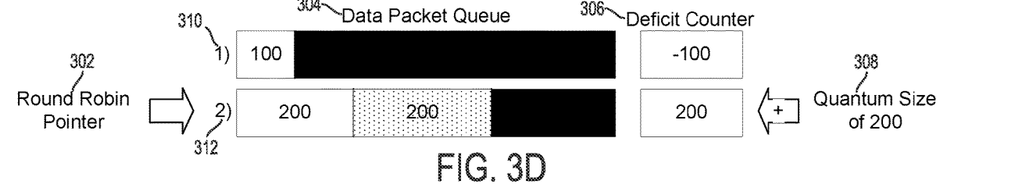

In FIG. 3D, after the round robin pointer 302 proceeds to the data packet position 312 from the data packet position 310, the deficit counter 306 of the data packet position 312 increases to a value of 200 via the addition from the quantum size of 200 bytes 308. As the data packet position 312 has queued a 200 byte data packet for transmission and has enough bytes of data (e.g., 200 bytes of data) available by the deficit counter 306, the data packet position 312 is permitted to transmit the next 200 bytes of data, which then decreases the deficit counter 306 to a value of 0.

Figure 3E:
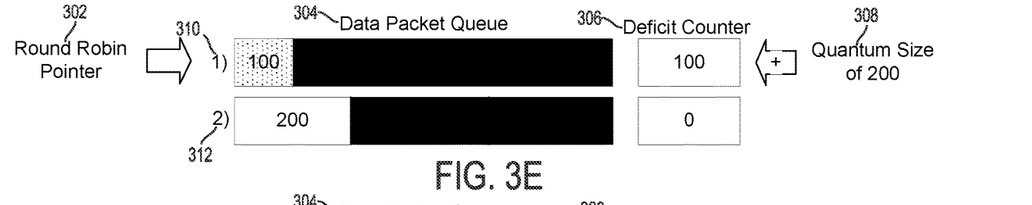

In FIG. 3E, after the 200 bytes of data of data packet position 312 has been transmitted, the deficit counter 306 of the data packet position 312 is reduced to a value of 0. The round robin pointer 302 can then proceed to data packet position 310 and allocate a quantum size of 200 bytes 308 to the deficit counter 306 of the data packet position 310 for a new value of 100 bytes. FIG. 3E further illustrates that the data packet position 310 has queued a 100 byte data packet for transmission. As the data packet position 310 has queued a 100 byte data packet for transmission and has enough bytes of data (e.g., 100 bytes of data) available by the deficit counter 306, the data packet position 310 is permitted to transmit the next 100 bytes of data, which then decreases the deficit counter 306 to a value of 0.

Figure 3F:
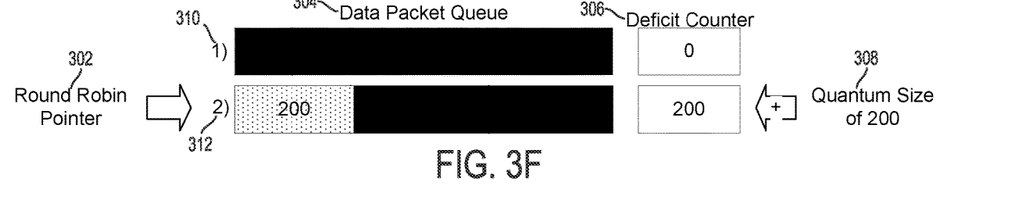

In FIG. 3F, after the 100 bytes of data of data packet position 310 has been transmitted, the deficit counter 306 of the data packet position 310 is reduced to a value of 0. The round robin pointer 302 can then proceed to data packet position 312 and allocate a quantum size of 200 bytes 308 to the deficit counter 306 of the data packet position 312 for a new value of 200 bytes. FIG. 3F further illustrates that the data packet position 312 has queued a 200 byte data packet for transmission. As the data packet position 310 has queued a 200 byte data packet for transmission and has enough bytes of data (e.g., 200 bytes of data) available by the deficit counter 306, the data packet position 312 is permitted to transmit the next 200 bytes of data, which then decreases the deficit counter 306 to a value of 0.

Figure 4:
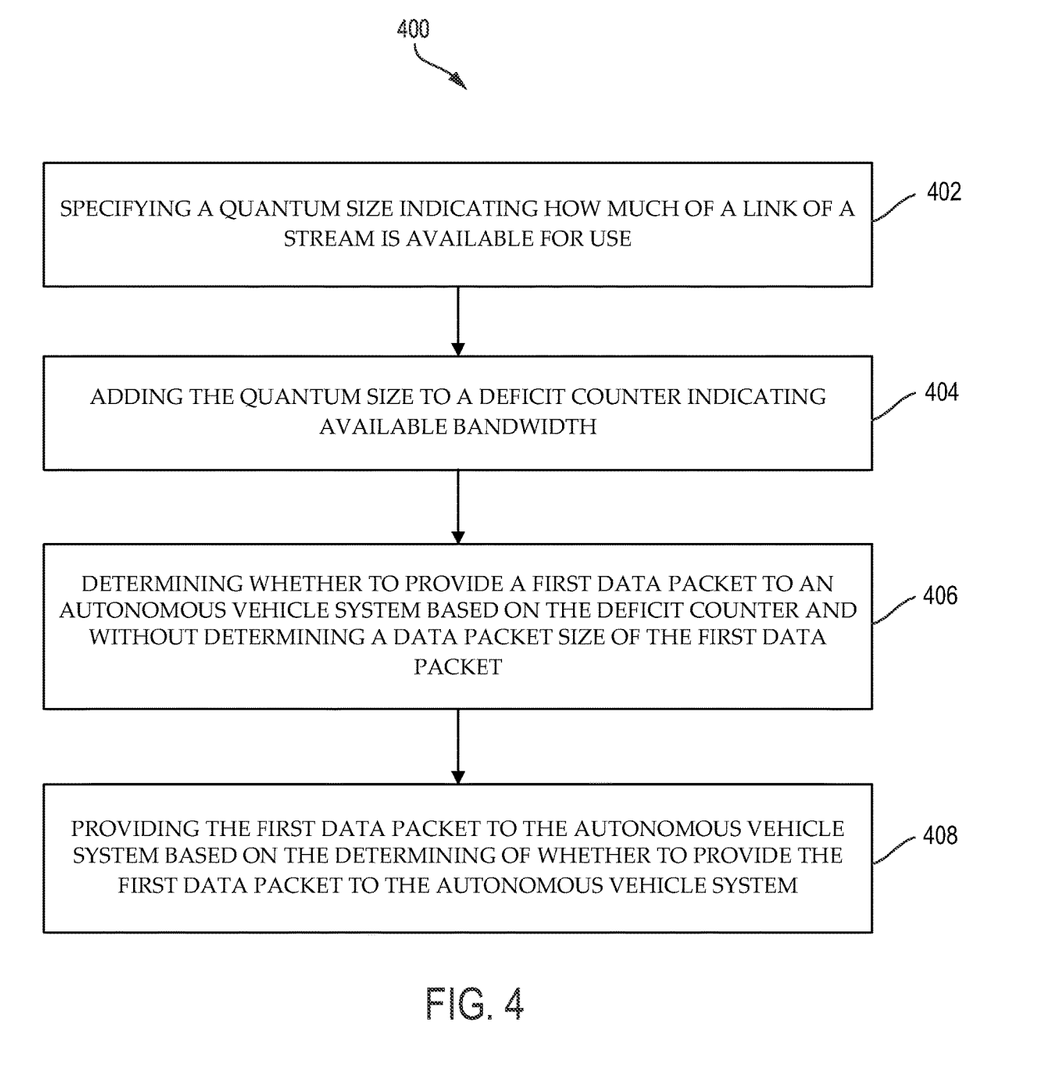
FIG. 4 illustrates an example process of implementing a streaming deficit round robin arbiter to provide fair utilization of a single link, according to some aspects of the disclosed technology.

Having disclosed some example system components and concepts, the disclosure now turns to FIG. 4, which illustrates an example method 400 for implementing a streaming deficit round robin arbiter to provide fair utilization of a single link. The steps outlined herein are exemplary and can be implemented in any combination thereof, including combinations that exclude, add, or modify certain steps.

At step 402, method 400 can include specifying, at a streaming deficit round robin arbiter, a quantum size indicating how much of a link of a stream is available for use. The quantum size can be predetermined and based on bandwidth availability in the autonomous vehicle system.

At step 404, method 400 can include adding, by the streaming deficit round robin arbiter, the quantum size to a deficit counter indicating available bandwidth. The deficit counter can fluctuate based on the data packet size of the first data packet provided to the autonomous vehicle system. The deficit counter can include a negative value when the data packet size of the first data packet is larger than a value of the deficit counter.

At step 406, method 400 can include determining, by the streaming deficit round robin arbiter, whether to provide a first data packet to an autonomous vehicle system based on the deficit counter and without determining a data packet size of the first data packet.

At step 408, method 400 can include providing, by the streaming deficit round robin arbiter, the first data packet to the autonomous vehicle system based on the determining of whether to provide the first data packet to the autonomous vehicle system.

The method 400 can further include proceeding to a second data packet in a data packet queue when the deficit counter of the first data packet is a negative value.

The method 400 can also include receiving the first data packet from a first vehicle electronic control unit and a second data packet from a second vehicle electronic control unit.

The method 400 can additionally include utilizing a round robin pointer to indicate which data packet of a plurality of data packets to compare with a corresponding deficit counter.

Figure 5:
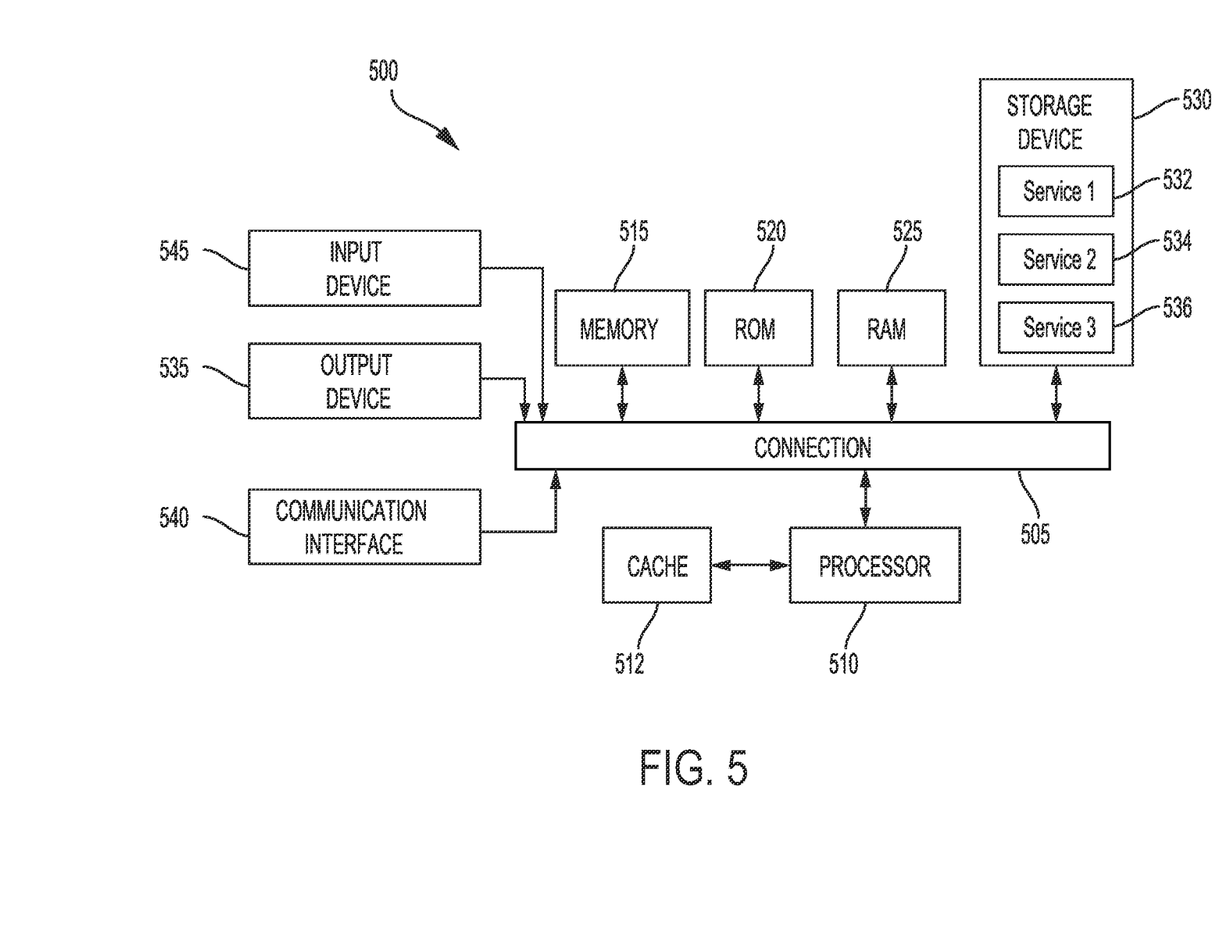
FIG. 5 illustrates an example processor-based system with which some aspects of the subject technology can be implemented.

FIG. 5 illustrates an example processor-based system with which some aspects of the subject technology can be implemented. For example, processor-based system 500 that can be any computing device making up internal computing system 110, remote computing system 150, a passenger device executing the rideshare app 170, internal computing device 130, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. By way of example computer-executable instructions can be used to implement perception system functionality for determining when sensor cleaning operations are needed or should begin. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method comprising:
specifying, at a streaming deficit round robin arbiter, a quantum size indicating how much of a link of a stream is available for use;
adding, by the streaming deficit round robin arbiter, the quantum size to a deficit counter indicating available bandwidth;
determining, by the streaming deficit round robin arbiter, whether to provide a first data packet to an autonomous vehicle system based on the deficit counter and without determining a data packet size of the first data packet; and
providing, by the streaming deficit round robin arbiter, the first data packet to the autonomous vehicle system based on the determining of whether to provide the first data packet to the autonomous vehicle system.

2. The computer-implemented method of claim 1, wherein the quantum size is predetermined and based on bandwidth availability in the autonomous vehicle system.

3. The computer-implemented method of claim 1, wherein the deficit counter fluctuates based on the data packet size of the first data packet provided to the autonomous vehicle system.

4. The computer-implemented method of claim 1, wherein the deficit counter includes a negative value when the data packet size of the first data packet is larger than a value of the deficit counter.

5. The computer-implemented method of claim 1, further comprising proceeding to a second data packet in a data packet queue when the deficit counter of the first data packet is a negative value.

6. The computer-implemented method of claim 1, further comprising receiving the first data packet from a first vehicle electronic control unit and a second data packet from a second vehicle electronic control unit.

7. The computer-implemented method of claim 1, further comprising utilizing a round robin pointer to indicate which data packet of a plurality of data packets to compare with a corresponding deficit counter.

8. A system comprising:
one or more processors; and
at least one computer-readable storage medium having stored therein instructions which, when executed by the one or more processors, cause the simulation system to:
specify a quantum size indicating how much of a link of a stream is available for use;
add the quantum size to a deficit counter indicating available bandwidth;
determine whether to provide a first data packet to an autonomous vehicle system based on the deficit counter and without determining a data packet size of the first data packet; and
provide the first data packet to the autonomous vehicle system based on the determination of whether to provide the first data packet to the autonomous vehicle system.

9. The system of claim 8, wherein the quantum size is predetermined and based on bandwidth availability in the autonomous vehicle system.

10. The system of claim 8, wherein the deficit counter fluctuates based on the data packet size of the first data packet provided to the autonomous vehicle system.

11. The system of claim 8, wherein the deficit counter includes a negative value when the data packet size of the first data packet is larger than a value of the deficit counter.

12. The system of claim 8, wherein the instructions which, when executed by the one or more processors, cause the system to proceed to a second data packet in a data packet queue when the deficit counter of the first data packet is a negative value.

13. The system of claim 8, wherein the instructions which, when executed by the one or more processors, cause the system to receive the first data packet from a first vehicle electronic control unit and a second data packet from a second vehicle electronic control unit.

14. The system of claim 8, wherein the instructions which, when executed by the one or more processors, cause the system to utilize a round robin pointer to indicate which data packet of a plurality of data packets to compare with a corresponding deficit counter.

15. A non-transitory computer-readable storage medium comprising:
instructions stored on the non-transitory computer-readable storage medium, the instructions, when executed by one more processors, cause the one or more processors to:
specify a quantum size indicating how much of a link of a stream is available for use;
add the quantum size to a deficit counter indicating available bandwidth;
determine whether to provide a first data packet to an autonomous vehicle system based on the deficit counter and without determining a data packet size of the first data packet; and
provide the first data packet to the autonomous vehicle system based on the determination of whether to provide the first data packet to the autonomous vehicle system.

16. The non-transitory computer-readable storage medium of claim 15, wherein the quantum size is predetermined and based on bandwidth availability in the autonomous vehicle system.

17. The non-transitory computer-readable storage medium of claim 15, wherein the deficit counter fluctuates based on the data packet size of the first data packet provided to the autonomous vehicle system.

18. The non-transitory computer-readable storage medium of claim 15, wherein the deficit counter includes a negative value when the data packet size of the first data packet is larger than a value of the deficit counter.

19. The non-transitory computer-readable storage medium of claim 15, wherein the instructions, when executed by the one more processors, cause the one or more processors to proceed to a second data packet in a data packet queue when the deficit counter of the first data packet is a negative value.

20. The non-transitory computer-readable storage medium of claim 15, wherein the instructions, when executed by the one more processors, cause the one or more processors to receive the first data packet from a first vehicle electronic control unit and a second data packet from a second vehicle electronic control unit.

* * * * *